Patented Sept. 8, 1931

1,822,358

UNITED STATES PATENT OFFICE

RICHARD MICHEL, OF UERDINGEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF SEPARATING ETHYLENE FROM THE HIGHER HOMOLOGUES THEREOF IN GASEOUS MIXTURES CONTAINING OLEFINES

No Drawing. Application filed March 18, 1929, Serial No. 348,146, and in Germany March 23, 1928.

The invention relates to a process of separating ethylene from the higher homologues thereof in gas mixtures containing olefines.

Industrial gases containing olefines such as oil gas, waste gas from oil cracking operations may be used as a starting material for obtaining pure chemical compounds. For this purpose it is frequently desired to separate the ethylene from the higher homologues thereof which accompany it.

I have found that this separation is very readily accomplished by reacting with a gas mixture containing olefines upon a catalytically acting aluminium halide e. g. anhydrous aluminium chloride or bromide dissolved or suspended in an inert solvent or diluent at atmospheric or reduced pressure. Under these conditions ethylene for all practical purposes remains unchanged while the higher homologues thereof are converted into condensation products of a higher molecular weight or are changed in another way. The reaction already proceeds at room temperature but it is advantageous in view of an increased efficiency to react with the gas mixture upon the condensation agent at a somewhat elevated temperature depending on the nature of the aluminium halide used, the rate of dilution of the olefine and the amount of solvent or diluent present.

The inert solvents or diluents suitable for carrying out the hereinbefore described process are those organic liquids which enter in reaction neither with the olefines nor with the condensation agent used, such as, for example saturated aliphatic hydrocarbons, completely hydrogenated cyclic hydrocarbons, for example, hexahydrobenzene, dekahydronaphthalene etc.

The first stage of reaction taking place in the process is the formation of an addition compound of olefine and aluminium halide; therefore, these addition compounds well known in the art may be used as condensing agents instead of the aluminium halide.

My invention is illustrated by the following examples, but not restricted thereto. The parts are by weight.

Example 1

A gas mixture containing 63 percent of ethylene and 37 percent of propylene is passed with stirring at 80 to 100° C. through a suspension of 60 parts of anhydrous aluminium chloride in 600 parts of dekahydronaphthalene. The escaping gas consists of ethylene and is entirely free from propylene which, whilst the contents of the vessel considerably increase is polymerized to gasoline like or oily hydrocarbons drawn off in certain intervals. After washing with water they are distilled and yield, in addition to easily volatile first runnings and unchanged dekahydronaphthalene, a clear bright yellow liquid of slight odor boiling from 125° to 300° C. at 15 mm. pressure.

Example 2

A gas mixture consisting or 30 per cent of ethylene, 12 percent of butylene and 58 percent of non-olefinic gases is passed with stirring at room temperature (15 to 20° C.) through a suspension of 45 parts of aluminium bromide in 600 parts of dekahydronaphthalene. The escaping gas does no longer contain butylene which is polymerized to similar products as shown in Example 1. The passing in of the gas mixture—sometimes interrupted by drawing off the polymerization products produced—is continued till the catalytic power of the aluminium bromide is exhausted. The polymerization products are washed with water and distilled. They yield, in addition to benzin-like first runnings and unchanged dekahydronaphthalene, yellowish oils boiling from 120 to 350° C. at 15 mm pressure. The escaping gas containing ethylene can readily be worked up further to pure ethylene derivatives as for example ethylene halides, ethylene halohydrins ethylene glycol and the like.

Example 3

A gas mixture obtained from cracking oil and containing 25 per cent of ethylene and 15 percent of propylene and higher homologues thereof is led with stirring at 60 to 80° C. into a suspension of 50 parts of anhydrous aluminium chloride in 500 parts of benzine (b. p. 90 to 110° C.). The escaping gas is practically freed from the higher olefines and contains only ethylene and non-olefinic constitutents. The passing in of the gas mixture is continued till the catalytic action of the aluminium chloride is exhausted. The polymerization products are distilled after washing with water. In addition to some low boiling benzine-like first runnings (b. p. 20° to 90°) and the benzine used as a diluent there is obtained a bulk consisting of an oily product boiling from 100 to 350° C. at 15 mm. pressure. By refining it with concentrated sulphuric acid and subsequent filtering through fuller's earth an odorless clear white oil without any taste is obtained.

In the following claims I use the term "inert diluent" to denote an inert liquid diluent or solvent of the kind hereinbefore mentioned, it being immaterial whether the aluminium halide or the addition compound thereof with an olefine is soluble therein or not.

I claim:

1. Process of separating ethylene from the homologues thereof in gas mixtures containing olefines which comprises reacting the gas mixture upon a dispersion of aluminium halide in an inert diluent at a pressure not essentially exceeding one atmosphere.

2. Process of separating ethylene from the homologues thereof in gas mixtures containing olefines which comprises reacting with an olefinic gas from a cracking oil operation upon aluminium chloride suspended in an inert diluent at a pressure not essentially exceeding one atmosphere.

In testimony whereof I have hereunto set my hand.

RICHARD MICHEL.